May 11, 1965 D. D. SLITER 3,183,516

DATA RECORDING APPARATUS

Filed Feb. 21, 1958 2 Sheets-Sheet 1

INVENTOR.
DONALD D. SLITER
BY
Edward A. Robinson
ATTORNEY

May 11, 1965 D. D. SLITER 3,183,516

DATA RECORDING APPARATUS

Filed Feb. 21, 1958 2 Sheets-Sheet 2

United States Patent Office 3,183,516
Patented May 11, 1965

3,183,516

DATA RECORDING APPARATUS

Donald D. Sliter, San Jose, Calif., assignor to International Business Machines Corporation, New York, N.Y., a corporation of New York Filed Feb. 21, 1958, Ser. No. 716,801
4 Claims. (Cl. 346—74)

This invention relates to data storage devices useful in accounting machines, computers, and the like, and more particularly to such data storage apparatus utilizing a storage medium such as a magnetizable surface by a transducer which may be moved into an operable position closely adjacent to the surface.

Magnetic storage arrangements are commonly employed in computers and may take the form of moving magnetic surfaces with transducers positioned adjacent thereto. Electrical signals carrying bit information may be impressed upon a transducer which in turn will impress magnetic "bits" upon a magnetic recording surface. To recover the information from storage at a subsequent time, the magnetized areas or "bits" may induce electrical signals in the winding of the transducer, and the bit information may be electrically passed to the circuitry of the computer.

A magnetic storage arrangement may utilize the plurality of magnetic surfaces together with a plurality of transducers, and a switching method must be provided for selecting a single one of the several transducers and electrically coupling that transducer to the computer circuitry while the remaining transducers remain isolated therefrom. The switching function may be accomplished magnetically by moving a selected transducer from an inoperative position remote from the recording surface to an operative position in close spaced relation with the recording surface such that the transducer will magnetically coact with the surface. The switching function may be broadly defined in terms of varying the magnetic circuit of a selected transducer such that the magnetic flux therefrom impinges upon and coacts with the recording surface.

It is an object of this invention to provide an improved electromechanical means for moving a transducer from an inoperative position remote from the recording surface to an operative position in close, spaced relation with the surface, thereby causing the magnetic circuit of the transducer to coact with the magnetic surface.

Another object of this invention is to provide an arrangement of electrostrictive elements for supporting a transducer and for moving the transducer into an operative position adjacent to the recording surface, the electrostrictive elements being coupled to provide a total movement which is greater than the individual movement of any one of said elements.

A further object of this invention is to provide recording apparatus including one or more magnetic surfaces together with a plurality of transducers each mechanically coupled to an electrostrictive device such that a selected transducer may be effectively switched into a computing circuit by being moved into an operative position in close, spaced relation with the magnetic surface.

Briefly stated, according to this invention, a magnetic recording apparatus includes a plurality of transducers adapted to coact wtih one or more recording surfaces, each of the transducers being supported by or otherwise mechanically coupled with a control device capable of moving a selected one of the transducers into an operative position closely adjacent to the recording surface. The control devices include electrostrictive elements which will deform in accordance with a control voltage which is applied thereto. By a selective application of a control voltage or signal to the electrostrictive elements, a selected transducer is moved into an operative position and thereby effectively switched into operation for "recording" on or "reproducing" from the recording surface.

Other objects of the invention will be pointed out in the following description and claims and illustrated in the accompanying drawings which disclose, by way of example, the principle of the invention and the best mode which has been contemplated of applying that principle.

Figure 1:
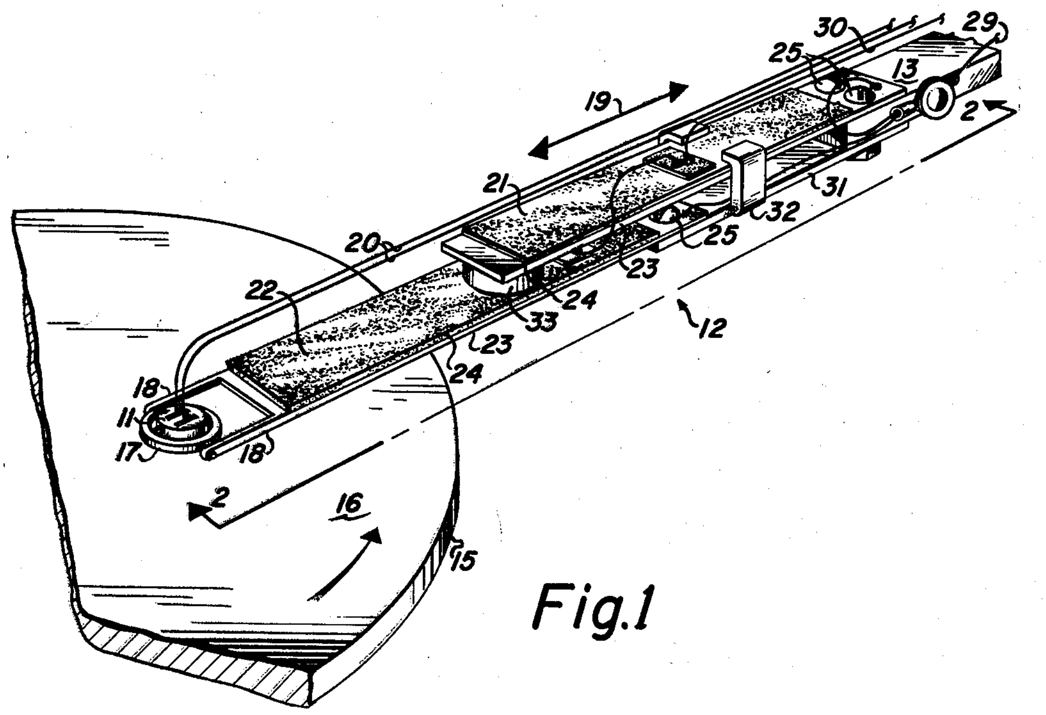
FIG. 1 is a perspective view of a magnetic recording arrangement including a transducer supported by an electrostrictive device and overlying a rotating disc which constitutes the magnetic recording surface.
Figure 2:
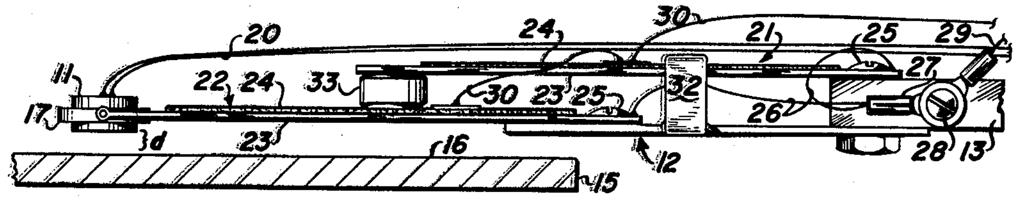
FIG. 2 is a vertical section along the plane 2—2 of FIG. 1 and illustrating the manner in which a transducer may be supported in an inoperative position remote from the recording surface.
Figure 3:
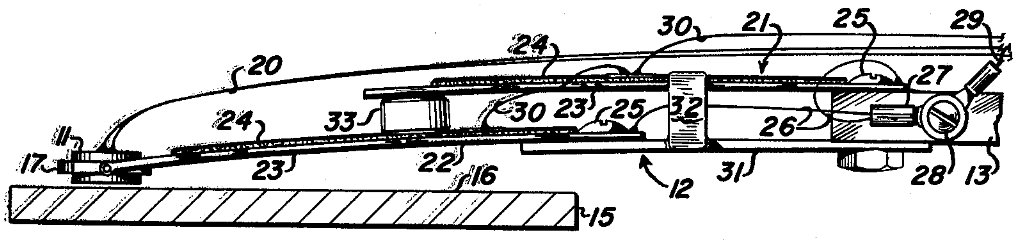
FIG. 3 is a vertical section similar to FIG. 2 but showing the electrostrictive device in an energized state such that the transducer supported thereby is moved into an operative position in close spaced relation with the recording surface.

In one form of this invention, a transducer 11 is supported by an electrostrictive device 12 which in turn is attached to and supported by an access arm 13 as is shown in FIGS. 1, 2 and 3. In a second form of this invention shown in FIGS. 4, 5, 6 and 7, the transducers 11*a* and 11*b* are supported on torsion rods 14*a* and 14*b* which in turn extend through and are rotatably supported in the access arm 13. Each of the torsion rods 14*a* and 14*b* is mechanically coupled to an electrostrictive device 12*a* or 12*b*.

Referring to the first embodiment as shown in FIGS. 1, 2 and 3, it may be seen that the transducer 11 is supported in spaced relation above a recording disc 15 having a magnetizable surface 16 underlying the transducer 11. The transducer 11 is pivotally supported in a gimbal ring 17 which is pivotally supported between a pair of prongs 18 extending from and forming a forked end of the electrostrictive device 12.

The transducer may be positioned over a selected track on the rotating disc 15 by causing the access arm 13 to move with respect to the disc 15 as indicated by arrows 19 whereby the transducer 11 is translated laterally across the disc 15 to a selected point. Information or data may then be recorded on or recovered from the surface by moving the transducer 11 vertically to an operative position in close spacement with the disc to permit coaction between the magnetic surface 16 and a magnetic circuit inherent in the transducer 11. In such a position the transducer may function to "record" information into or "reproduce" information out of a particular track upon the recording surface 16 which has been selected by the lateral positioning of the access arm 13. The transducer 11 functions to convert magnetic signals from the recorded surface 16 into electrical signals which pass to other components of a computer (not shown) by means of electrical conductors 20, or conversely the electrical signals may pass to the transducer 11 through the conductor 20 and be converted into magnetic signals stored in the magnetic surface 16. As shown in FIG. 2, the transducer 11 is supported above the magnetic surface 16 at a distance *d* therefrom, and therefore the transducer 11 is in an inoperative position since it is too remote from the surface 16 to allow a substantial magnetic coaction therebetween. As shown in FIG. 3, the transducer 11 has been moved into close proximity with the magnetic surface 16, and therefore the transducer 11 is in an operative position with its magnetic circuit coacting with the surface. Thus, it may be appreciated that by moving the transducer 11 from a position as shown in FIG. 2 to a position as shown in FIG. 3 a switching operation has been accomplished since the transducer has been rendered operative to pass signals representative of data between electrical circuits which may be coupled to the conductor 20 and a selected magnetic track on the disc 15.

In actual practice it has been found that the switching operation may be accomplished by moving the transducer a relatively short distance from a position which may be considered remote with respect to the surface to a position of coaction with the surface. Thus in an inoperative position, the distance *d* may be substantially equal to no less than .030 inch, while in an operative position the distance between the transducer 11 and the recording surface 16 may be of the order of .0002 to .0001 inch. While recording, the transducer 11 may be urged or biased downwardly toward the surface 16 and supported in a gliding position by a thin film of air. A gimbal mount is provided to permit the transducer to pivot about either of two perpendicular axes and to thereby glide naturally on the air film while being held or biased downwardly toward the surface.

The electrostrictive device 12 constitutes a means for moving the transducer 11 from a remote inoperative position as in FIG. 2 to an operative position as in FIG. 3. This control device 12 is sensitive to an electric control signal and will respond thereo by deforming or bending downwardly. The device 12 includes a pair of tandemly coupled electrostrictive elements 21 and 22 each capable of deforming or bending in response to a control voltage. In preferred form, the elements 21 and 22 are similar to each other and comprise a strip or thin slab of barium titanate, which is a ceramic material, and an electrical insulator. The opposite faces of the barium titanate strip have been rendered electrically conductive by means such as the vacuum plating of a metallic conductive material directly thereon or the affixing of thin flexible metal backing strips upon the faces. In the embodiment as shown each of the electrostrictive elements 21 and 22 includes a bottom metal backing strip 23 which underlies and is bonded to a wafer of barium titanate material 24. The ends of the metallic backing strip 23 may extend somewhat to form the prongs 18 at one end of the element 22 and to provide electrical connections at the other ends. As shown in FIGS. 2 and 3, the electrostrictive elements 21 and 22 may be supported and secured by means such as a threaded machine screw 25 extending through the metal backing 23 at the rearward end thereof. The machine screw 25 further provides an electrical connection for a conductor 26 which is grounded to the access arm 13 by a lug 27 held by a further machine screw 28. A further conductor 29 provides an electrical conduction path independent of ground to the circuit for controlling electrostrictive devices.

In addition to the grounded conductor 29, a further control conductor 30 connects with the top surface of the barium titanate material 24 of both electostrictive elements 21 and 22. Thus, it may be appreciated that the two elements 21 and 22 are electrically connected in parallel and are both connected to the control conductors 29 and 30 of which conductor 29 is grounded. In an electrical circuit, the electrostrictive elements 21 and 22 constitute capacitors since each includes a pair of metallic conductors or plates separated by an insulating medium which is the barium titanate material. The barium titanate material is electrostrictive in nature and will therefore deform or bend when placed in an electric field. By applying voltage across the control conductors 29 and 30, the elements 21 and 22 each become charged as a capacitor and an electric field is established through the barium titanate material which constricts and bends. Barium titanate crystals exhibit a polarity in deformation such that the face charged negatively will become convex, and the face charged positively will become concave. As shown in FIGS. 1, 2 and 3, the upper faces of elements 21 and 22 must receive a negative control voltage to effect a downward deformation. Therefore, the control voltage applied to conductor 30 should be negative with respect to the grounded conductor 29. It has been found that a strip or wafer of barium titanate which is approximately 1.5 inches in length will produce a displacement at one end thereof equal to .020 inch when a control signal of 300 volts is applied thereto. These electrostrictive elements are available commercially and are sold under the trade name of "Mullenbach Capadynes."

As is shown in FIGS. 1, 2 and 3, the first electrostrictive element 21 is secured at one end to the access arm 13 by a machine screw 25. A flexible metallic support 31 is likewise secured to the access arm 13 and extends outwardly therefrom substantially parallel to the electrostrictive element 21. The second electrostrictive element 22 is secured to the extending member 31 and forms a further extension for the device 12. A yoke 32 may be fixed to the member 31 and may partially encircle the element 21 to impart a yieldable downward force against the element 21 at a point intermediate of the ends thereof. The yoke 32 must be formed of insulating material or must be provided with means such as spacers to avoid making electrical contact with the upper surface of the electrostrictive element 21. A spacer 33 of non-conducting material is inserted between the elements 21 and 22 at the extremity of the element 21. This spacer may be secured in place by a slight bonding or mastic applied to the lower surface of the extreme of element 21.

With the two elements 21 and 22 mounted as shown and described, the end displacement of each element is cumulative and the resulting displacement of the transducer 11 will be greater than either of the individual displacements of the elements 21 or 22. Thus when a signal voltage is applied across the control conductors 29 and 30, the element 21 will deflect downwardly and by means of the spacer 33 will impinge upon and depress the element 22, and therefore the element 22 will move downwardly both because of the impingement thereon and because of its own electrostrictive action.

Figures 4, 5, 6, 7, 8:
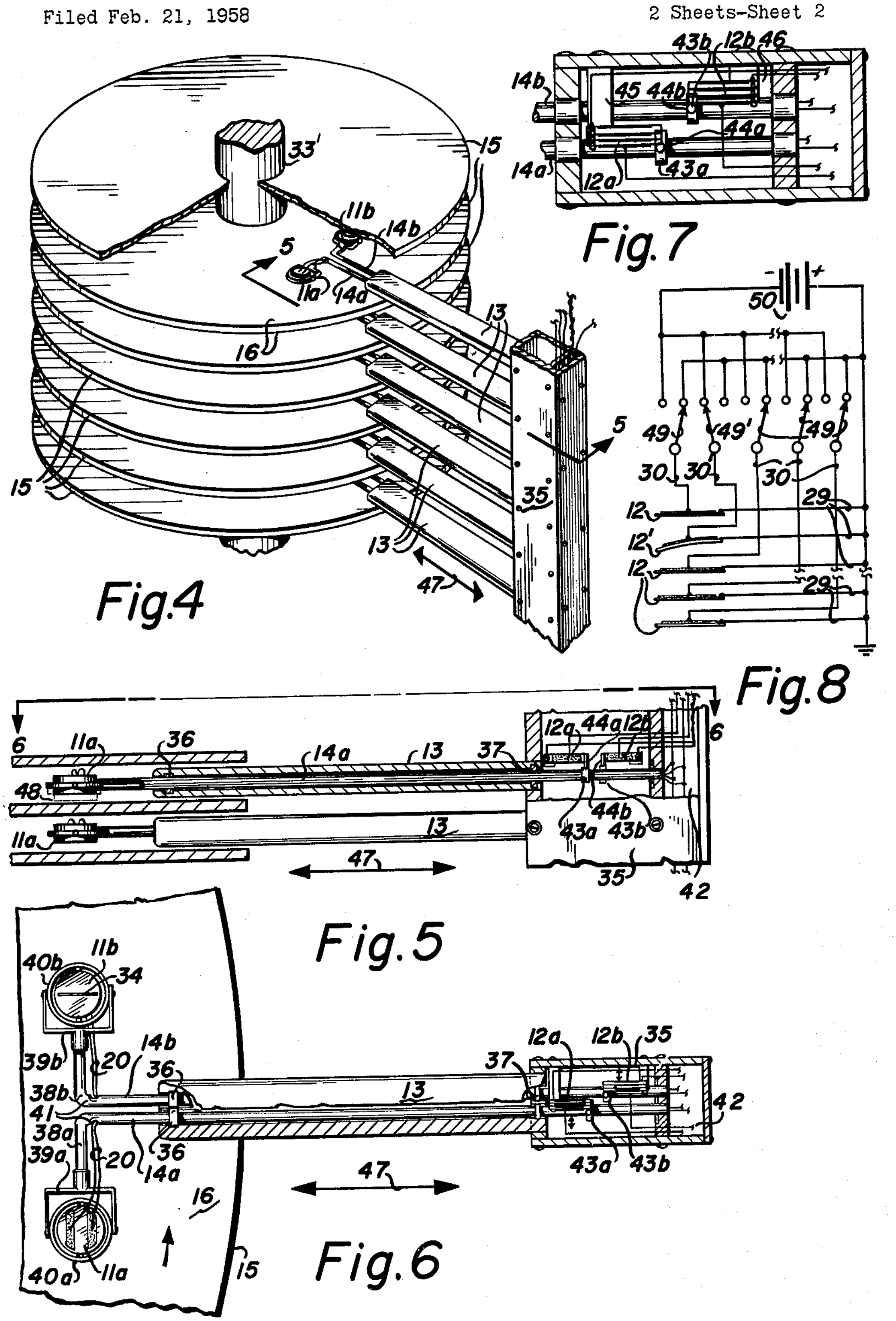
FIG. 4 is a fragmentary perspective view of a data storage arrangement for a computer showing a plurality of disc recording surfaces together with access arms supporting a transducer in spaced relation with each of the surfaces.
FIG. 5 is an enlarged fragmentary vertical section along the line 5—5 of FIG. 4.
FIG. 6 is a horizontal section along the line 6—6 of FIG. 5.
FIG. 7 is an enlarged vertical section of a portion of the access arm of FIG. 6.
FIG. 8 is a schematic diagram of a simplified circuit for controlling the electrostrictive devices of this invention.

In the second embodiment of this invention as shown in FIGS. 4, 5, 6 and 7, the transducers **11*a* and 11*b* are not supported directly by the electrostrictive devices, but rather are supported by torsion rods 14*a* and 14*b* to which the electrostrictive devices 12*a* and 12*b* are mechanically coupled. The storage device shown in FIG. 4 comprises a plurality of discs fixed to and rotatable with a common drive shaft 33'. Both the upper and the lower surfaces 16 of each of the discs 15 may be coated with a suitable magnetic material for magnetically recording information thereon. An access arm 13 is provided for each adjacent pair of discs 15 and is positioned to extend therebetween. Each access arm encloses two torsion rods 14*a* and 14*b* which may be disposed parallel to each other and in the same horizontal plane. The torsion rods 14*a* are arranged to support the transducers 11*a* which are positioned to move downwardly and to coact with the upper surfaces of the underlying discs 15. On the other hand, the arrangement of the torsion rod 14*b* and the transducers 11*b* supported thereby permits the transducer to be urged upwardly into an operative position closely adjacent to the lower surface of each of the overlying discs 15. Thus as seen in FIG. 6, the transducer 11*a* faces downwardly to coact with the upper surface 16** of the disc 15 and the conductors 20 emerge from the top of the transducer. On the other hand, the transducer 11*b* is facing upwardly such that a magnetic gap 34 may cooperate with the lower surface of the overlying disc 15 which has been removed to expose the structure of the transducers and supporting torsion rods.

As shown in FIGS. 4, 5 and 6, the access arms 13 extend horizontally from a vertical column 35. The torsion rods 14*a* and 14*b* extend through the access arms 13 and are rotatably supported by forward bearings 36 positioned near the extremity of the access arm and by rear bearings 37 supported at the rear of the access arm where the arm 13 enters the column 35. The forward extremities of the torsion rods 14*a* and 14*b* are turned to form crank ends 38*a* and 38*b* (see FIG. 6), and a fork 39*a* or 39*b* is secured thereto for providing a pivotal support to the gimbal ring 40*a* or 40*b*. Thus it may be appreciated, that as either of the torsion rods 14*a* or 14*b* is rotated, the corresponding transducer 11*a* or 11*b* will be urged against a selected magnetic surface, either underlying or overlying the particular access arm 13. The torsion rods 14*a* and 14*b* may be hollow tubes, and the conductors 20 from each of the transducers may enter the tubes at appropriate openings 41 and may thereby extend through the access arm to the rear part of the column 35 which may then constitute a channel 42 for containing the electrical wiring needed in the magnetic storage device.

As shown in FIGS. 5, 6 and 7, each of the torsion rods 14*a* and 14*b* extends through a part of the column 35. Collars 43*a* and 43*b* are secured to the torsion rods and provide an upwardly extending crank arm 44*a* or 44*b* associated with each rod. The electrostrictive devices are each associated with one of the torsion rods 14*a*–14*b* and are each secured to a bracket or statonary part at one end thereof and to the upstanding crank arm 44*a*–44*b* at the other end thereof. As may be best seen in FIG. 7, the electrostrictive devices 12*a* and 12*b* may each include a plurality of single electrostrictive elements similar to the elements 21 and 22 shown in FIGS. 1, 2 and 3. However, in the present embodiment, the electrostrictive elements are arranged in parallel with one end of each element secured to a fixed bracket 45 or 46 and with the other end of each element all coupled to the common crank arm 44*a*–44*b*. With such a parallel type arrangement of electrostrictive elements, the total deflection of the whole electrostrictive device is no more than the deflection of a single electrostrictive element. However, the force exerted by each of the individual elements is additive, and therefore the total force is substantially equal to the sum of all of the individual forces of each of the electrostrictive elements. In this embodiment, an increased displacement applied to each of the transducers 11*a*–11*b* results from the difference in the length of the crank arms at the opposite ends of each torsion rod. Thus, it will be appreciated that since the crank arm 38*a* supporting the transducer 11*a* is of greater length than the crank arm 44*a* connected to the electrostrictive device 12*a*, the displacement of the transducer 11*a* will be proportionately greater than the displacement of which the electrostrictive element 12*a* is capable. As shown in FIG. 7, each of the depicted electrostrictive devices 12*a*–12*b* is composed of four parallel coupled Capadyne elements. These Mullenbach Capadynes, available commercially, may be combined in a parallel arrangement of eight or more elements and are capable of producing a combined force of 500 grams. Thus, it is seen that a sufficient force is available to properly load a transducer even though the force at the transducer is proportionately less because of the difference in the length of the crank arms.

In the operation of a magnetic storage device, as shown in FIG. 4, the vertical column 35 may be translated as shown by the arrows 47 to move the access arm 13 and the transducers 11*a*–11*b* to a desired point for selecting a radial track, and then a selected one of the transducers 11*a*–11*b* is caused to move into an operative position to magnetically coact with a selected disc, as shown by the dashed lines 48 in FIG. 5. Since only one of the transducers is placed in an operative position while all of the others remain in a substantially remote position with respect to their recording surfaces, it will be appreciated that the electrical components of the computer have been switched to and coupled with a single magnetic track in the data storage device. It is therefore unnecessary to provide an electrical switching arrangement between the various transducers and the circuitry of the computer, since this function is accomplished by the movement of the selected transducer with respect to the recording surface.

FIG. 8 illustrates a rudimentary control circuit for causing the operation of a selected one of the electrostrictive devices 12. Each of the electrostrictive devices 12 utilizes two control conductors 29 and 30 of which the conductor 29 is grounded and connected to a common ground bus. The control conductors 30 each extend to an individually selective means which in FIG. 8 is depicted as a transfer switch 49. Normally all of the transfer switches 49 are coupled to the ground bus and thereby constitute short circuits for the respective electrostrictive devices 12. When it is desired to activate a particular electrostrictive element such as 12′, then the corresponding transfer switch 49′ is shifted to place a voltage from a source such as 50 upon a selected control conductor 30′. Thus, the voltage of the source 50 is applied across the electrostrictive device 12′, and it is illustrated in a deformed condition in FIG. 8.

The circuit of FIG. 8 is illustrative of one possible type of control circuit, and it is not suggested to be the only manner of applying a control voltage to a selected electrostrictive element of this invention. In actual practice, the switches 49 would probably be replaced with fast-acting electronic relay means, and the selection of a particular relay may be accomplished by a matrix arrangement of electronic elements.

A feature of this invention lies in the fact that a selected one of many transducers may be switched into a computer circuit merely by moving that transducer into an operative relation with a recording surface. This may be broadly defined in terms of the magnetic field and magnetic elements associated with the transducer, and it may be said that the magnetic circuit of a transducer is varied to include a part of the recording surface therein. As illustrated in the embodiments heretofore described, the magnetic circuit of the transducer is opened by physically separating the transducer from the recording surface, but it is conceivable that the switching and selection of a particular transducer may be accomplished by moving a shorting bar across a recording gap in the transducer to thereby render the transducer ineffective without physically moving the transducer as a whole.

A further feature of this invention lies in the fact that a transducer is urged against the magnetic surface by a force which is determined by the voltage applied to the electrostrictive device associated with that transducer. For example, if twice the voltage were applied across a selected electrostrictive device, the force exerted upon the transducer in urging it downwardly against the magnetic surface would be substantially twice as great. Likewise, if the voltage applied to the electrostrictive device were decreased, the force urged against the transducer would likewise be decreased. This fact leads to the possibility of providing an automatic gain control circuit for holding the transducer against a recording surface with a precise amount of force to deliver a signal therefrom at a desired level. Since the signal level of the transducer is a function of the spacing between that transducer and the moving magnetic surface, the level may be sampled to generate an error signal in accordance with known techniques, and the error signal, positive or negative, may be added to the voltage from the source 50 to increase or decrease the force exerted on the transducer to correct and optimize the signal level produced therefrom. In any system such as shown in FIG. 4, the recording surfaces may not be true with various discs 15 and therefore the disc may have a wobble or unevenness similar to that of a warped phonograph record. Although this wobble may be microscopic in nature and not discernible to the eye, it may nevertheless affect the transduced signal to cause "run-out" or continual variation in amplitude. If an AGC circuit were provided to continuously sample the signal level and to continuously correct the force exerted on the transducer, the "run-out" may be minimized. A further function of the AGC arrangement may be to compensate for the "read" signal variation between different concentric tracks on a disc surface. Since the voltage developed by the transducer is proportional to $d\phi/dt$ or the time rate of change of magnetic flux, the induced voltages are proportional to the linear speed of the selected recording track, and therefore the "read" voltages are substantially proportional to the radius of the track. The AGC circuit may thus be used to maintain the output signals constant as the transducer is shifted from an outer track to an inner track and vice versa.

It has been found that the operation of the electrostrictive devices, as herein described, is extremely fast and than an element will deform in the matter of 10–50 milliseconds. This fact leads to a further feature of this invention; namely, a fast operating "fail-safe" arrangement. Thus, the embodiment of this invention, as depicted in FIGS. 1, 2 and 3, is extremely small and light weight, and the transducer could be moved quickly from an operative position, as shown in FIG. 3, to the inoperative position as shown in FIG. 1. If the access arm and transducer were electrically isolated from the disc 15, a circuit may be arranged to detect any contact or touching that may occur between the transducer 11 and the disc 15. If such contact were detected, electronic relays could remove the voltage from and provide a short circuit across the control conductors 29 and 30, thereby causing the transducer to be quickly lifted from the disc 15 to minimize the damage that might result from such contact.

While there have been shown and described and pointed out the fundamental novel feature of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A control device for supporting a transducer on an access arm, said device comprising a first electrostrictive element attached to the access arm, a resilient member attached to the access arm, and a second electrostrictive element attached at one end to the resilient member and supportingly engaged with the transducer at the other end, the extremity of the first electrostrictive element being coupled to exert a force against the mid-section of the second electrostrictive element.

2. A control device for supporting a transducer on an access arm and for translating the transducer in response to a control signal, said device comprising a first electrostrictive element having one end fixed to the access arm, a resilient member extending from the access arm, a second electrostrictive element having one end fixed to the resilient member and extending therefrom, a spacer positioned between the extremity of the first electrostrictive element and an intermediate point of the second electrostrictive element, the extremity of the second electrostrictive element being forked and pivotally supporting the transducer.

3. A control device for supporting a transducer on an access arm and for translating the transducer in response to a control signal, said device comprising a first electrostrictive element having one end fixed to the access arm, a resilient member extending from the access arm, a second electrostrictive element having one end fixed to the resilient member and extending therefrom, a yoke fixed to the resilient member and partially encircling the first electrostrictive element for exerting a resilient force thereagainst, the extremity of the first electrostrictive element being coupled to an intermediate point on and urging against the second electrostrictive element, the transducer being pivotally mounted at the end of the second electrostrictive element.

4. A control device for supporting a transducer on an access arm and for translating the transducer in response to a control signal, said device comprising a first electrostrictive element having one end fixed to the access arm, a resilient member fixed to and extending from the access arm, and a second electrostrictive element having one end fixed to the resilient member, the first electrostrictive element and the resilient member being mechanically coupled together whereby the first electrostrictive element is urged downwardly at the mid-point thereof, the extremity of the first electrostrictive element being coupled to urge downwardly against the mid-point of the second electrostrictive element, said first and second electrostrictive elements being electrically connected in parallel by a pair of conductors, one of said conductors being grounded, said transducer being pivotally supported by the second electrostrictive element and being translated by an amount substantially greater than the individual deflections of each of the electrostrictive elements.

References Cited by the Examiner

UNITED STATES PATENTS

| | | | |
|---|---|---|---|
| 1,760,198 | 5/30 | Hough | 178—7.6 |
| 2,195,417 | 4/40 | Mason | 310—8.6 X |
| 2,227,268 | 12/40 | Mason | 179—110.1 X |
| 2,325,238 | 7/43 | Flint | 310—8.6 X |
| 2,532,803 | 12/50 | Faus | 179—100.2 |
| 2,537,657 | 1/51 | D'Humy et al. | 179—100.2 |
| 2,683,856 | 7/54 | Kornei | 340—174.1 X |
| 2,743,988 | 5/56 | Allyn | 346—74 |
| 2,835,761 | 5/58 | Crownover | 310—8.5 X |
| 2,897,484 | 7/59 | Vogel | 340—174.1 |
| 2,901,738 | 8/59 | Willard | 179—100.2 |
| 2,950,354 | 8/60 | Hohnecker | 179—100.2 |
| 2,994,856 | 8/61 | Dickinson | 340—174.1 |

FOREIGN PATENTS

| | | |
|---|---|---|
| 758,865 | 10/56 | Great Britain. |
| 763,780 | 12/56 | Great Britain. |

IRVING L. SRAGOW, *Primary Examiner.*

L. MILLER ANDRUS, NEWTON N. LOVEWELL, BERNARD KONICK, *Examiners.*